US005492347A

United States Patent [19]
Palmeri et al.

[11] Patent Number: 5,492,347
[45] Date of Patent: Feb. 20, 1996

[54] CART MOBILIZING APPARATUS

[76] Inventors: Ignazio Palmeri; Saverio Conca, both of 21 Fifth Ave., Port Washington, N.Y. 11050

[21] Appl. No.: 359,034

[22] Filed: Dec. 19, 1994

[51] Int. Cl.$^6$ ........................................................ B62B 1/04
[52] U.S. Cl. ..................... 280/47.131; 280/30; 280/47.24; 280/79.2; 297/130
[58] Field of Search .................................. 280/30, 47.24, 280/63, 652, 47.131, 47.15, 767, 769, 762; 297/129, 130, DIG. 4

[56] References Cited

U.S. PATENT DOCUMENTS

2,622,893  12/1959  Wasserlein ..................... 280/47.331
4,852,895  8/1989  Moffitt .......................... 280/47.131
4,934,719  6/1990  duPont .............................. 280/767

Primary Examiner—Richard Camby

[57] ABSTRACT

A portable interchangeable device for mobilizing a chair including a first wheel, a second wheel, an axle, a plate, and attachment apparatus. The axle connects the first wheel to the second wheel. The plate is rotatably mounted on the axle and prevents the first wheel and the second wheel from sinking into sand when the first wheel and the second wheel are mobilized. The attachment apparatus interchangeably secures the first wheel, the second wheel, the axle, and the plate to a variety of different sized chairs.

9 Claims, 4 Drawing Sheets

CART MOBILIZING APPARATUS

BACKGROUND OF THE INVENTION

1. Field of the Invention

The present invention relates to mobile can apparatus. More particularly, the present invention relates to a portable interchangeable wheel assembly for mounting to various beach chairs and the like.

2. Description of the Prior Art

It has always been fun to go to the beach, camping, on picnics, or fishing. However, it is not fun having to carry all the required items. Various carting devices are available to assist in carrying the required items. However, these carting devices are neither portable nor readably attachable to an existing chair allowing a standard chair to convert into a cart. Additionally, when existing carting devices are used on soft sand or grass, the wheels have a tenancy to sink causing the cart to stop.

Numerous innovations for mobile cart apparatus have been provided in the prior art that will be described. However, even though these innovations may be suitable for the specific individual purposes to which they address, they differ from the present invention in that they do not convert a standard chair into a cart.

For example, U.S. Pat. No. 5,062,650 to Chang teaches a multi-function chair. The must-function chair includes a fore leg and a hind leg. The fore leg and the hind leg are pivotally combined and adapted to become a chair or a light duty truck. The multi-function chair can be folded up for storage. This device does convert a variety of standard chairs into carts.

Another example, U.S. Pat. No. 4,836,938 to Kobasic teaches a multipurpose chair structure. The multipurpose chair structure includes an upright frame. The upright frame has a pair of horizontally spaced and vertically extending side members. A seat is mounted on the frame. The frame is provided with a backrest which extends between the side members and above the seat. The side members extend beneath the seat and provide a pair of horizontally spaced legs. The pair of horizontally space legs support the seat for sitting when the frame is propped up against some fixed object. This device does convert a variety of standard chairs into carts.

Another example, U.S. Pat. No. 5,040,807 to Snover teaches a combined beach chair and wheelbarrow apparatus. The combined beach chair and wheelbarrow apparatus includes pivotally attached framework units that has a flexible cargo unit suspended therefrom. A pivoted wheel assembly unit is attached to one of the framework units while having members to vary the angular orientation of the wheel assembly unit relative to the framework unit. A support unit changes the apparatus from a chaise lounge/wheelbarrow configuration to a chair configuration. This device does convert a variety of standard chairs into carts.

Another example, U.S. Pat. No. 5,160,182 to Change teaches a multi-function chair. The multi-function chair includes a fore leg frame and a hind leg frame. The fore leg frame and the hind leg frame movably intersect each other so as to stand on the ground as a chair or to be folded in a straight line as a light duty truck with casters to move on the ground. This device does convert a variety of standard chairs into carts.

Another example, U.S. Pat. No. Des. 329,995 teaches an invalid-carrying beach chair with telescoping handle. This device does convert a variety of standard chairs into carts.

Another example, U.S. Pat. No. 4,659,142 to Kuchinsky teaches a combination beach caddy and beach chair. The combination beach caddy and beach chair includes a first web which extends between arms of a first elongated U-shaped frame member. A pair of rollers are rotatably mounted on an axle that extends between distal ends of the arm of the fast U-shaped frame member. A second web extends between the arms of a second U-shape frame member and are secured to their distal ends. The second web further extends horizontally to the arms of the first U-shaped frame member between the first web and the axle. This device does convert a variety of standard chairs into carts.

Another example, U.S. Pat. No. 5,265,892 to Said teaches a folding chair cart. The folding cart chair includes a flexible cargo container folds deflects inside-out as the cart truss that supports it changes orientation from a cart to a chair and visa-versa. Wheels are rotatably mounted at the aft lower crossbar of support struts. Leg supports that provide static stability are pivotally mounted to extend forward so as to resist tipping moments about the wheel axle. Rotation of the forward end of the cart brings the rearward upper connect strut in contact with the support surface and exposes the underside of the inverted flexible container. Support struts that make up the truss fold and yield a non-use flat configuration for storage. Snap releasable interconnections separate the struts from the truss in further disassembly. This device does convert a variety of standard chairs into carts.

It is apparent that numerous innovations for mobile cart apparatus have been provided in the prior an that are adapted to be used. Furthermore, even though these innovations may be suitable for the specific individual purposes to which they address, they would not be suitable for the purposes of the present invention as heretofore described.

SUMMARY OF THE INVENTION

Accordingly, it is an object of the present invention to provide a portable interchangeable apparatus for mobilizing a standard beach chair and the like that avoids the disadvantages of the prior art.

It is another object of the present invention to provide a portable interchangeable device for mobilizing a standard beach chair and the like that is simple and inexpensive to manufacture.

It is another object of the present invention to provide a portable interchangeable device for mobilizing a standard beach chair and the like that is simple to attach.

It is another object of the present invention to provide a portable interchangeable device for mobilizing a standard beach chair and the like that requires no tools to attach.

It is another object of the present invention to provide a portable interchangeable device for mobilizing a standard beach chair and the like that allows the standard beach chair and the like to become a cart for beach items, camping items, fishing items and the like.

It is another object of the present invention to provide a portable interchangeable device for mobilizing a standard beach chair and the like that includes a skid plate that skids over soft sand, grass and the like.

It is another object of the present invention to provide a portable interchangeable device for mobilizing a standard beach chair and the like that includes a first wheel, a second wheel, an axle that connects the first wheel to the second wheel, a plate that is rotatably mounted on the axle and prevents the first wheel and the second wheel from sinking into sand when the first wheel and the second wheel are mobilized, and attachment apparatus for interchangeably securing the first wheel, the second wheel, the axle, and the plate to a variety of different sized chairs.

It is another object of the present invention to provide a portable interchangeable device for mobilizing a standard beach chair and the like wherein the plate has a top, a bottom, a front face, an open lip, a closed lip, and a back face, the open lip is disposed at the bottom of the plate and faces the back face of the plate, the closed lip is disposed at the top of the plate and faces the front face of the plate, the closed lip of the plate rotationally receives the axle.

It is another object of the present invention to provide a portable interchangeable device for mobilizing a standard beach chair and the like wherein the axle has a length that is adjustable.

It is another object of the present invention to provide a portable interchangeable device for mobilizing a standard beach chair and the like wherein the attachment apparatus is a bungee cord, belt, strap or any combination thereof.

It is another object of the present invention to provide a portable interchangeable device for mobilizing a standard beach chair and the like wherein the attachment apparatus is a plurality of hook and loop fasteners.

It is another object of the present invention to provide a portable interchangeable device for mobilizing a standard beach chair and the like wherein the attachment apparatus is a plurality of clamps.

It is another object of the present invention to provide a portable interchangeable device for mobilizing a standard beach chair and the like wherein the bungee cord is disposed on the plate.

It is another object of the present invention to provide a portable interchangeable device for mobilizing a standard beach chair and the like wherein the plurality of hook and loop fasteners are disposed on the plate.

It is another object of the present invention to provide a portable interchangeable device for mobilizing a standard beach chair and the like wherein each of the first wheel and the second wheel include a respective collar on which each of the plurality of clamps are slidably mounted.

It is another object of the present invention to provide a portable interchangeable device for mobilizing a standard beach chair and the like wherein the each of the first wheel and the second wheel and the respective collar are integrally formed of the same material.

It is another object of the present invention to provide a portable interchangeable device for mobilizing a standard beach chair and the like wherein the material is plastic.

It is another object of the present invention to provide a portable interchangeable device for mobilizing a standard beach chair and the like wherein the plate is plastic or molded plastic.

It is another object of the present invention to provide a portable interchangeable device for mobilizing a standard beach chair and the like wherein the plastic plate is a one piece extrusion It is another object of the present invention to provide a portable interchangeable device for mobilizing a standard beach chair and the like wherein the plate is metallic.

It is another object of the present invention to provide a portable interchangeable device for mobilizing a standard beach chair and the like wherein the metallic plate is a one piece stamping.

The novel features which are considered characteristic of the present invention are set forth in the appended claims. The invention itself, however, to its construction, together with additional objects and advantages thereof, will be best understood from the following description of the specific embodiments when read and understood in connection with the accompanying drawing.

LIST OF REFERENCE NUMERALS UTILIZED IN THE DRAWING

PREFERRED EMBODIMENT

10—portable interchangeable apparatus for mobilizing a standard beach chair
12—chair
12A—chair lower crossmember
12B—chair upper crossmember
14—user
16—goods
18—pair of wheels
18A—wheel rim
18AA—wheel rim treads
18B—wheel rim hub
18C—wheel spokes
18D—wheel collar
20—axle
20A—pair of axle ends
22—plate
22A—plate front face
22B—plate back face
22C—plate top
22D—plate bottom
22E—plate open lip
22F—plate closed lip
22G—plate hole
24—bungee cord
24A—bungee cord free end 24B—bungee cord knotted end
26—hook

FIRST ALTERNATE EMBODIMENT

110—portable interchangeable apparatus for mobilizing a standard beach chair
118—pair of wheels
118A—wheel rim
118AA—wheel rim treads
118B—wheel rim hub
118C—wheel spokes
118D—wheel collar
120—axle
120A—pair of axle ends
122—plate
122A—plate front face
122B—plate back face
122C—plate top
122D—plate bottom
122E—plate open lip
122F—plate closed lip
122H—pair of multiple plate adjusting slots
122I—pair of multiple plate securing slots
122J—plate ends
126—first pair of hook and loop fasteners
128—second pair of hook and loop fasteners

SECOND ALTERNATE EMBODIMENT

210—portable interchangeable apparatus for mobilizing a standard beach chair
212C—chair vertical rail
218—pair of wheels
218A—wheel rim
218AA—wheel rim treads
218B—wheel rim hub
218C—wheel spokes
218D—wheel collar
220—axle
220A—pair of axle ends
222—plate
222A—plate front face
222B—plate back face
222C—plate top
222D—plate bottom
222E—plate open lip
222F—plate closed lip
228—pair of clamps
228A—clamp main body portion
228A—clamp main body throughbore
228C—clamp first leg
2228CA—clamp fast leg distal end
228CB—clamp first leg slot
228CC—clamp first leg flange
228D—clamp second leg
228DA—clamp distal end
228DB—clamp second leg opened slot
230—T-shaped member
230A—T-shaped member vertical bar
230B—T-shaped member horizontal bar
230BA—T-shaped member horizontal bar male threads
232—wing nut

THIRD ALTERNATE EMBODIMENT

310—portable interchangeable apparatus for mobilizing a standard beach chair
318—pair of wheels
318A—wheel rim
318AA—wheel rim treads
318B—wheel rim hub
318C—wheel spokes
3188D—wheel collar
320—axle
320A—pair of axle pipes
320AA—axle pipe plain end
320AB—axle pipe male threaded end
320B—axle coupling
320BA—pair of axle coupling female threaded ends
322—plate
322A—plate front face
322B—plate back face
322C—plate top
322D—plate bottom
322E—plate open lip
322F—plate closed lip
322G—plate hole
324—bungee cord
324A—bungee cord free end
324B—bungee cord knotted end
326—hook

DETAILED DESCRIPTION OF THE PREFERRED EMBODIMENT

Figure 1:
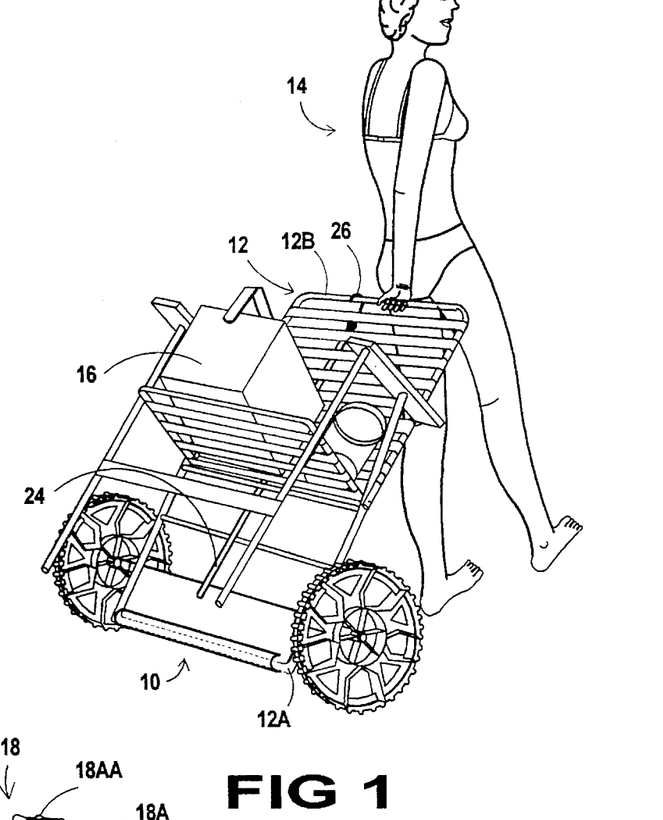
FIG. 1 is a perspective view of the portable device for mobilizing a standard beach chair or the like of the present invention attached to a standard beach chair while the standard beach chair functions as a cart that is being pulled by a user.

Referring now to the figures in which like numbers represent like elements, as can be seen in FIG. 1, the portable interchangeable apparatus for mobilizing a standard beach chair and the like of the present invention is shown generally at 10 positioned to chair lower crossmember 12A of a chair 12. The portable interchangeable apparatus for mobilizing a standard beach chair and the like 10 is mounted by a hook 26 of a bungee cord 24 to the chair lower crossmember 12A of the chair 12. The chair 12 is pulled, at chair upper crossmember 12B, by a user 14 and can function as a cart for carrying goods 16.

Figure 2:
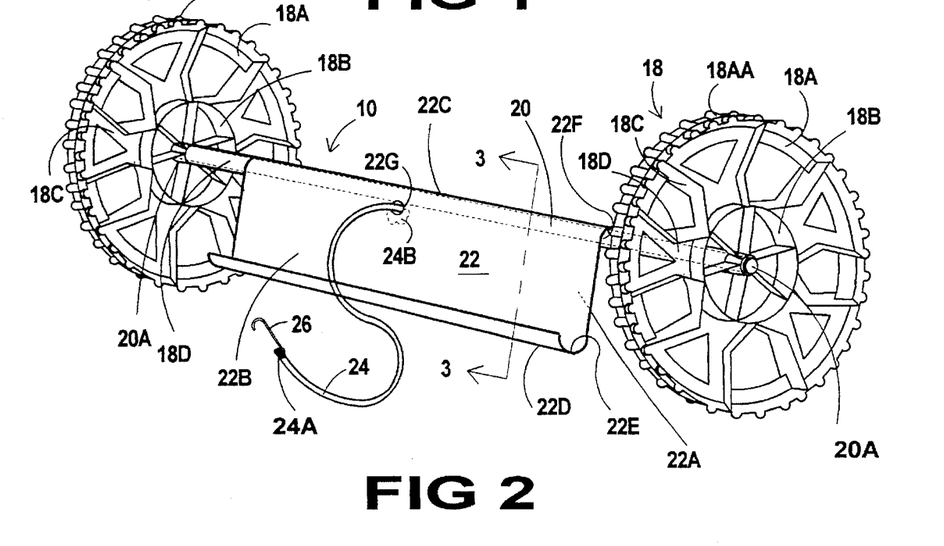
FIG. 2 is a perspective view of the present invention, shown in FIG. 1.

As shown in FIG. 2, the portable interchangeable apparatus for mobilizing a standard beach chair and the like 10 includes a pair of wheels 18, an axle 20, and a plate 22.

Each of the pair of wheels 18 include a wheel rim 18A, wheel rim treads 18AA, wheel center hub 18B, wheel spokes 18C, and wheel collar 18D. The wheel rim treads 18AA of the wheel rim 18A are disposed on the wheel rim 18A of the wheel 18, while the wheel collar 18D of the wheel 18 is disposed on the wheel center hub 18B of the wheel 18. The wheel rim 18A of the wheel 18 and the wheel center hub 18B of the wheel 18 are connected to each other by the wheel spokes 18C of the wheel 18.

The axle 20 is rotatably received by the plate 22 and includes a pair of axle ends 20A which are received by each wheel collar 18D of each wheel 18, respectively.

The plate 22 includes a plate front face 22A, a plate back face 22B, a plate top 22C, a plate bottom 22D, a plate open lip 22E, a plate closed lip 22F, and contains a plate hole 22G. The plate 22 can be extruded from plastic or pressed from a metal.

The bungee cord 24 has a bungee cord free end 24A and a bungee cord knotted end 24B. The plate hole 22G of the plate 22 receives the bungee cord knotted end 24B of the bungee cord 24. The hook 26 is disposed at the bungee cord free end 24A of the bungee cord 24 and secures the portable interchangeable apparatus for mobilizing a standard beach chair and the like 10 to the standard beach chair 12. Since the bungee cord 26 is positioned at the center of the portable interchangeable apparatus for mobilizing a standard beach chair and the like 10, the portable interchangeable apparatus for mobilizing a standard beach chair and the like 10 is adaptable to various width chairs.

Figure 3:
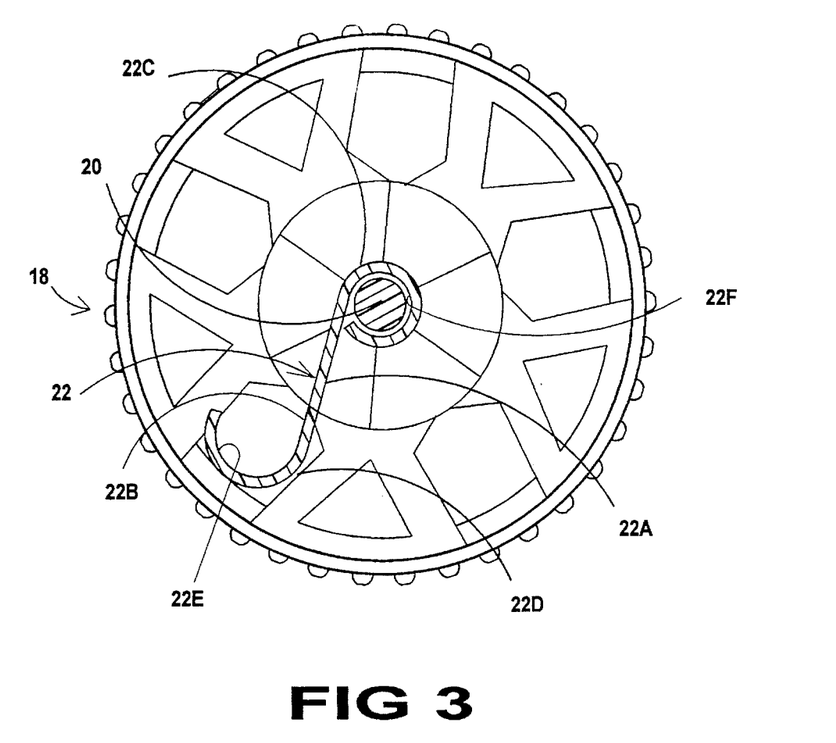
FIG. 3 is a cross sectional view of the present invention taken along line 3—3 in FIG. 2.

Further, as can be seen in FIG. 3, the closed plate loop 22F of the plate 22 is formed at the plate top 22C of the plate 22 and in the direction of the plate front 22A of the plate 22. The open plate loop 22E of the plate 22 is formed at the plate bottom 22D of the plate 22 and in the direction of the plate back 22B of the plate 22. The plate closed lip 22F of the plate 22 rotatably receives the axle 20 while the plate open lip 22E of the plate 22 removably receives the bottom chair crossmember 12A of the chair 12 (see FIG. 1).

In operation, the chair lower crossmember 12A of the chair 12 is positioned in the plate open lip 22E of the plate 22 in the way that the front face 22A of the plate 22 faces in the direction of expected travel. In this way the plate bottom 22D of the plate 22 can readily skim over any loose sand, grass or the like without allowing the portable interchangeable apparatus for mobilizing a standard beach chair and the like 10 to sink into the ground. The bungee cord 24 is then extended and the hook 26 is hooked onto the upper crossmember 12B of the chair 12 and secures the portable interchangeable apparatus for mobilizing a standard beach chair and the like 10 to the chair 12.

Figure 4:
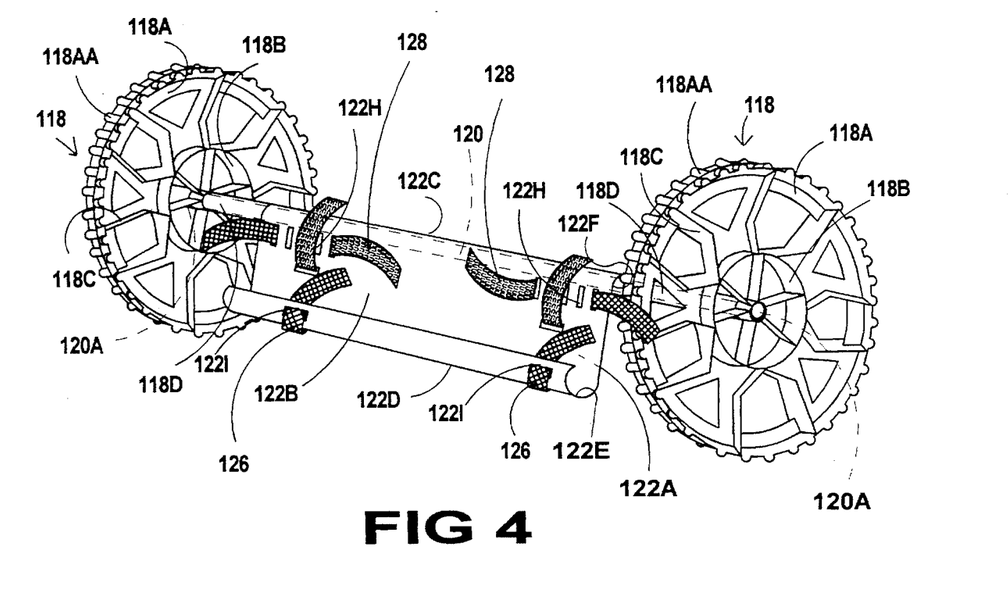
FIG. 4 is a perspective view of the first alternate embodiment of the present invention, wherein hook and loop fasteners are used for attachment.

The first alternate embodiment of the present invention is shown in FIG. 4, generally at 110, and includes a pair of wheels 118, an axle 120, and a plate 122.

Each of the pair of wheels 118 include a wheel rim 118A, wheel rim treads 118AA, wheel center hub 118B, wheel spokes 118C, and wheel collar 118D. The wheel rim treads 118AA of the wheel rim 118A of the wheel 118 are disposed on the wheel rim 118A of the wheel 118 while the wheel collar 118D of the wheel 118 is disposed on the wheel center hub 118B of the wheel 118. The wheel rim 118A of the wheel 118 and the wheel center hub 118B of the wheel 118 are connected to each other by the wheel spokes 118C of the wheel 118.

The axle 120 rotatably receives the plate 122 and includes a pair of axle ends 120A which are received by each wheel collar 118D of each wheel 118, respectively.

The plate 122 includes a plate front face 122A, a plate back face 122B, a plate top 122C, a plate bottom 122D, a plate open lip 122E, plate ends 122J, and a plate closed lip 122F. The plate 122 contains a pair of multiple plate adjusting slots 122H and a pair of multiple plate securing slots 122I. The pair of multiple plate adjusting slots 122H of the plate 122 are disposed at the plate top 122C of the plate 122 yet below the plate closed lip 122F of the plate 122 while the pair of multiple plate adjusting slots 122I of the plate 122 straddle the plate open lip 122E of the plate 122. Each of the pair of multiple plate adjusting slots 122H and each of the pair of plate securing slots 122I are disposed near each of the plate ends 122J of the plate 122. A fast hook and loop fastener 126 is received by each of the pair of multiple securing slots 122I of the plate 122 and secures the lower chair crossmember of the chair within the plate open lip 122E of the plate 122. Further, a second hook and loop fastener 128 is received by each of the pair of multiple adjusting slots 122H of the plate 122 would receive each of the vertical rails of the chair so that the portable interchangeable apparatus for mobilizing a standard beach chair and the like 110 is prevented from rotating relative to the chair. Since each of the pair of multiple adjusting slots 122H contain multiple slots, the portable interchangeable apparatus for mobilizing a standard beach chair and the like 110 is adaptable to various width chairs. The plate 122 can be extruded from plastic or pressed from a metal.

In operation, the chair lower crossmember of the chair is positioned in the plate open lip 122E of the plate 122 in such a way that the front face 122A of the plate 122 faces in the direction of expected travel. In this way the plate bottom 122D of the plate 122 can readily skim over an loose sand, grass or the like without allowing the portable interchangeable apparatus for mobilizing a standard beach chair and the like 110 to sink into the ground. The first pair of hook and loop fasteners 126 are secured around the lower crossmember of the chair while each of the second pair of hook and loop fasteners 128 disposed in each of the pair of multiple adjusting slots 122H are secured around the vertical rails of the chair.

Figure 5:
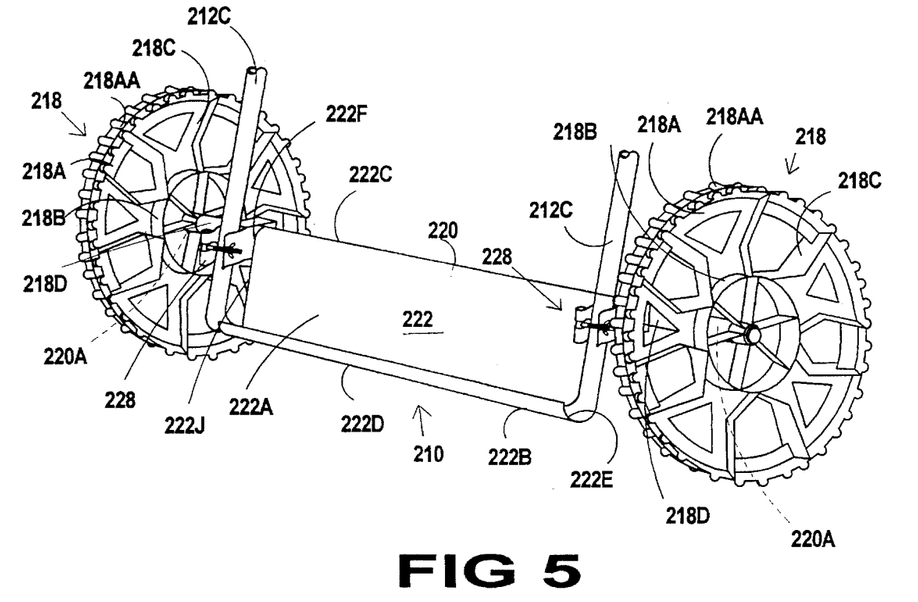
FIG. 5 is a perspective view of the second alternate embodiment of the present invention, wherein clamps are used for attachment.
Figure 6:
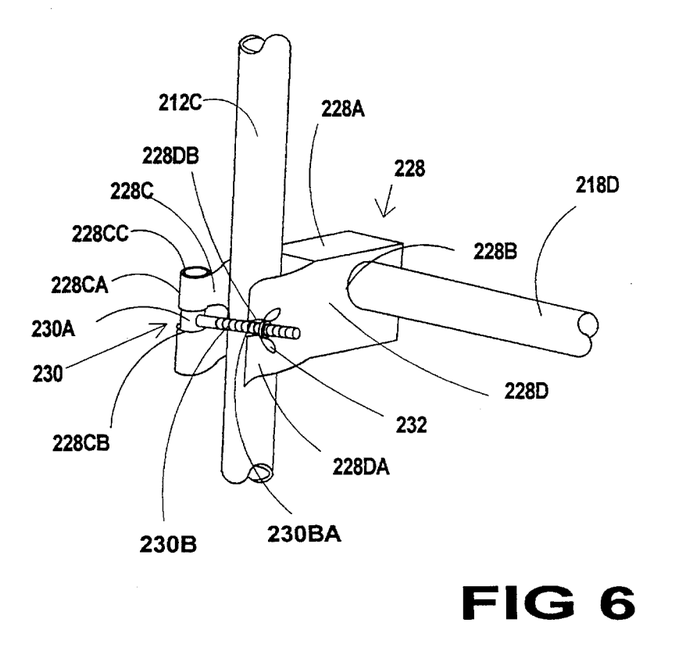
FIG. 6 is a perspective view of the clamp shown in FIG. 5.

The second alternate embodiment of the present invention is shown in FIGS. 5 and 6, generally at 210, and includes a pair of wheels 218, an axle 220, a pair of clamps 228, and a plate 222.

Each of the pair of wheels 218 include a wheel rim 218A, wheel rim treads 218AA, wheel center hub 218B, wheel spokes 218C, and wheel collar 218D. The wheel rim treads 218AA of the wheel rim 218A of the wheel 218 are disposed on the wheel rim 218A of the wheel 218 while the wheel collar 218D of the wheel 218 is disposed on the wheel center hub 218B of the wheel 218. The wheel rim 218A of the wheel 218 and the wheel center hub 218B of the wheel 218 are connected to each other by the wheel spokes 218C of the wheel 218.

The axle 220 is rotatably mounted to the plate 222 and includes a pair of axle ends 220A which are rotatably received by each wheel collar 218D of each wheel 218, respectively.

The plate 222 includes a plate front face 222A, a plate back face 222B, a plate top 222C, a plate bottom 222D, a plate open lip 222E, plate ends 222J, and a plate closed lip 222F. The plate 222 can be extruded from plastic or pressed from a metal.

Each clamp 228 is rotatably mounted to each wheel collar 218D of each wheel 218 and removably receives the chair vertical rail 212C of a chair. The clamp 228 includes a clamp main body portion 228A which contains a clamp main body portion throughbore 228B. Extending outwardly from the clamp main body portion 222A of the clamp 228 is a clamp first leg 228C and a clamp second leg 228D. A T-shaped member 230 adjustably connects the clamp first leg 228C and the clamp second leg 228D.

The clamp first leg 228C of the clamp 228 contains, at its distal end 228CA, a clamp first leg slot 228CB. The distal end 228CA of the clamp first leg 228C of the clamp 228 rolls outwardly from the clamp first leg 228C and forms a clamp first leg flange 228CC. The clamp second leg 228D of the clamp 228 contains, at its distal end 228DA, a clamp second leg opened slot 228DB.

The T-shaped member 230 is formed by a vertical bar 230A and a horizontal bar 230B. The horizontal bar 230B of the T-shaped 230 member has horizontal bar male threads 230BA disposed thereon. The vertical bar 230A of the T-member 230 is pivotally received by the clamp fast leg flange 228CC while the horizontal bar 230B of the T-shaped member 230 passes through the clamp first leg slot 228CB of the clamp first leg 228C and enters the second leg open slot 228DB of the second leg 228D. The horizontal bar male threads 230B A of the horizontal bar 230B extend passed the clamp second leg open slot 228CB of the clamp second leg 230C. A wing nut 232 is threaded onto the horizontal bar male threads 230B A of the horizontal bar 230B so that the clamp 228 can be tightened around the chair rail 212C.

In operation, the chair lower crossmember of the chair is positioned in the plate open lip 222E of the plate 222 in a way that the front face 222A of the plate 222 faces in the direction of expected travel. In this way the plate bottom 222D of the plate 222 can readily skim over any loose sand, grass or the like without allowing the portable interchangeable apparatus for mobilizing a standard beach chair and the like 210 to sink into the ground. The T-shaped member 230 is pivoted outwardly from the clamp 230 and allowing the vertical chair rails 212C of the chair to enter the clamp 228. The T-shaped member 230 is then returned to the second leg slot 228DB and the wing nut 232 is tightened on the T-shaped member 230 compressing the clamp first leg 228C and the clamp second leg 228D against the chair vertical rail 212C of the chair. This secures the chair to and prevents the rotation of the portable interchangeable apparatus for mobilizing a standard beach chair 210. Since each of the pair of clamps 228 slide along each wheel collar 218D of each wheel 218, respectively, their spacing from each other can be varied and therefore adjust to different width chairs.

Figure 7:
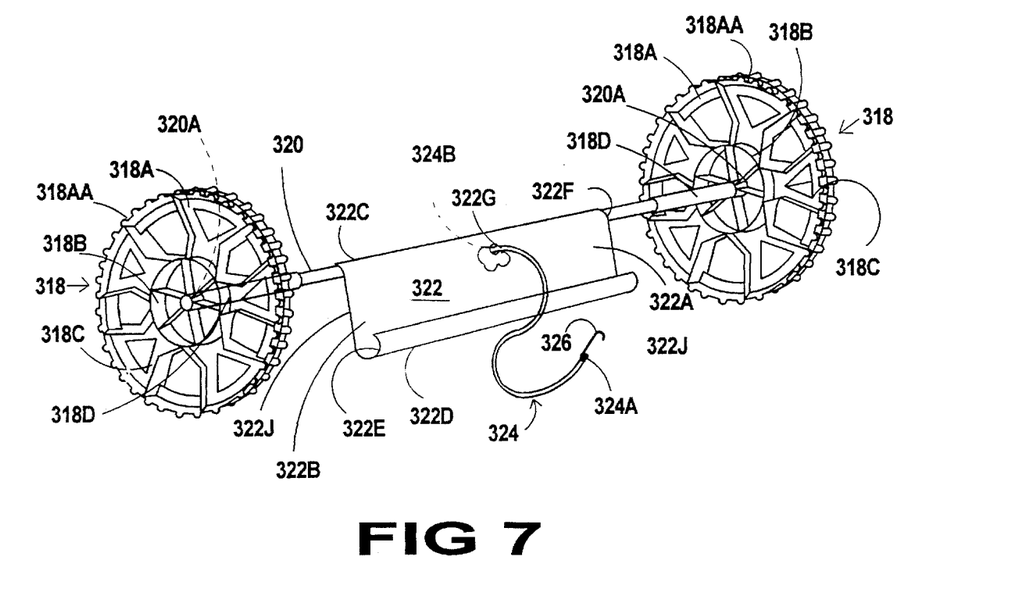
FIG. 7 is the third alternate embodiment of the present invention wherein the length of the axle is adjustable.
Figure 8:
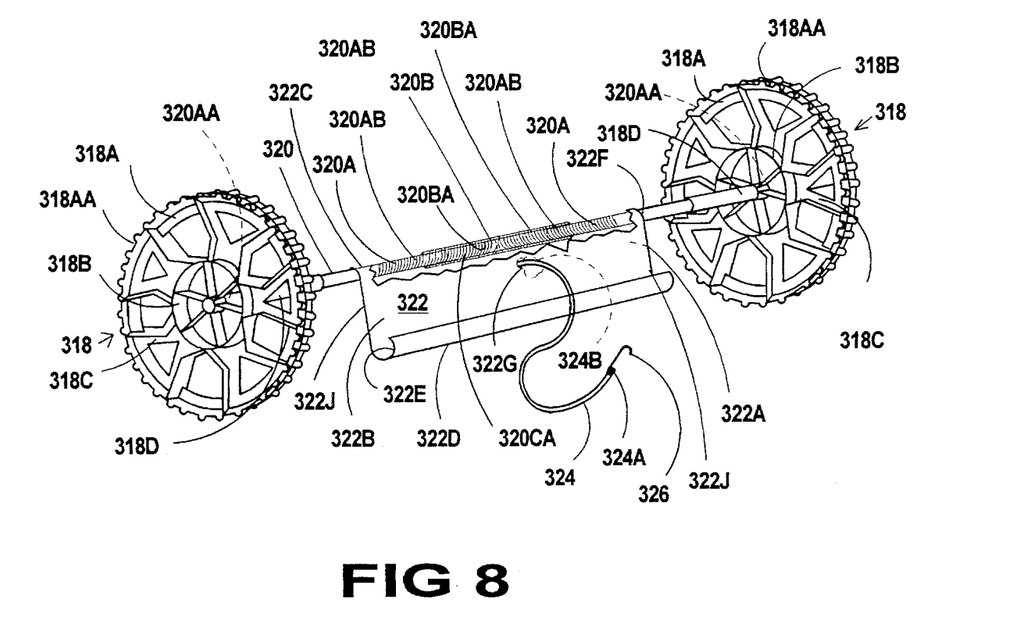
FIG. 8 is a perspective cutaway view of the third embodiment of the present invention, as shown in FIG. 7, wherein the axle adjusting apparatus is shown in detail.

The third alternate embodiment of the present invention is shown in FIGS. 7 and 8, generally at 330 and includes a pair of wheels 318, an axle 320, a bungee cord 324, and a plate 322.

Each of the pair of wheels 318 include a wheel rim 318A, wheel rim treads 318AA, wheel center hub 318B, wheel spokes 318C, and wheel collar 318D. The wheel rim treads 318AA of the wheel rim 318A of the wheel 318 are disposed on the wheel rim 318A of the wheel 318 while the wheel collar 318A of the wheel 318 is disposed on the wheel center hub 318B of the wheel 318. The wheel rim 318A of the wheel 318 and the wheel center hub 318B of the wheel 318 are connected to each other by the wheel spokes 318C of the wheel 318.

The axle 320 includes a pair of axle pipes 320A and an axle coupling 320B. Each axle pipe 320A includes an axle pipe plain end 320AA and an axle pipe male threaded end 320AB. The axle coupling 320B includes a pair of female threaded ends 320BA. Each axle pipe plain end 320AA of each axle pipe 320A is received by the collar 318D of each wheel 318, respectively, while each axle pipe male threaded end 320AB of each axle pipe 320A is received by each of the pair of axle coupling female threaded end 320BA of the pipe coupling 320B, respectively. By turning each of the pair of axle pipes 320A, relative to axle coupling 320C, the length of the axle 320 can be increased or decreased to adjust to chairs with different widths.

The plate 322 includes a plate front face 322A, a plate back face 322B, a plate top 322C, a plate bottom 322D, a plate open lip 322E, plate ends 322J, a plate closed lip 322F, and contains a plate hole 322G. The bungee cord 324 has a bungee cord free end 324A and a bungee cord knotted end 324B. The plate hole 322G of the plate 322 receives the bungee cord knotted end 324B of the bungee cord 324. A hook 326 is disposed at the bungee cord free end 324A of the bungee cord 324 and secures the portable interchangeable apparatus for mobilizing a standard beach chair and the like 310 to a chair. The plate 322 can be extruded from plastic or pressed from metal or injected molded plastic.

In operation, each of the pair of axle pipes 320A of the axle 320 are turned, relative to axle coupling 320C, so that the length of the axle 320 can be increased or decreased to adjust to the chair's width. The chair lower crossmember of the chair is then positioned in the plate open lip 322E of the plate322 in the way that the front face 322A of the plate 322 faces in the direction of expected travel. In this way, the plate bottom 322D of the plate 322 can readily skim over an loose sand, grass or the like without allowing the portable interchangeable apparatus for mobilizing a standard beach chair and the like 310 to sink into the ground. The bungee cord 324 is extended and the hook 326 is hooked onto the upper crossmember of chair and secures the portable interchangeable apparatus for mobilizing a standard beach chair and the like 310 to the chair.

While the invention has been illustrated and described as embodied in a portable interchangeable apparatus for mobilizing a standard beach chair and the like, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

What is claimed as new and desired to be protected by Letters Patent is set forth in the appended claims.

1. A portable interchangeable device for mobilizing a chair, comprising:

a) a first wheel;

b) a second wheel;

c) an axle connecting the first wheel to the second wheel; and d) a plate, the plate has a top, a bottom, a front face, an open lip, a closed lip, and a back face, the open lip of the plate disposed at the bottom of the plate and facing the back face of the plate, the closed lip disposed at the top of the plate and facing the front face of the plate, the closed lip of the plate rotatably receiving the axle, the plate rotatably mounted on the axle and preventing the fast wheel and the second wheel from sinking into sand when the first wheel and the second wheel are mobilized, the plate open lip functioning to removably engage a chair cross member therein, the open lip and the closed lip arranged below and above one another, respectively.

2. The portable interchangeable device for mobilizing a chair as described in claim 1, wherein the device further comprises an attachment means for interchangeably securing the first wheel, the second wheel, the axle, and the plate to a variety of different sized chairs.

3. The portable interchangeable device for mobilizing a chair as described in claim 1, wherein the axle has a length that is adjustable.

4. The portable interchangeable device for mobilizing a chair as described in claim 2, wherein the attachment means is selected from a group consisting of elastic cord, strap and belt.

5. The portable interchangeable device for mobilizing a chair as described in claim 4, wherein the attachment means is disposed on the plate.

6. The portable interchangeable device for mobilizing a chair as described in claim 1, wherein the plate is manufactured from a group of substances consisting of plastic, epoxy, fiberglass, metal alloys and carbon-graphite.

7. The portable interchangeable device for mobilizing a chair as described in claim 6, wherein the plate is a manufactured as one piece extrusion.

8. The portable interchangeable device for mobilizing a chair as described in claim 6, wherein the plate is manufactured from one piece stamping.

9. The portable interchangeable device for mobilizing a chair as described in claim 6, wherein the plate is manufactured from molded plastic.

* * * * *